United States Patent
Lialiamou et al.

(10) Patent No.: US 8,082,197 B2
(45) Date of Patent: Dec. 20, 2011

(54) COMMUNICATION SYSTEM

(75) Inventors: Elena Lialiamou, Pireaus (GR); Marco Stura, Espoo (FI); Harold G. Fuchs, Vienna (AT); Jouni Ljungqvist, Helsinki (FI); Matti Juvonen, Kauniainen (FI); Petri Uusitalo, Kauniainen (FI)

(73) Assignee: Nokia Corporation, Espoo (FI)

( * ) Notice: Subject to any disclaimer, the term of this patent is extended or adjusted under 35 U.S.C. 154(b) by 79 days.

(21) Appl. No.: 10/612,343

(22) Filed: Jul. 3, 2003

(65) Prior Publication Data
US 2004/0148263 A1 Jul. 29, 2004

Related U.S. Application Data

(60) Provisional application No. 60/442,061, filed on Jan. 24, 2003.

(51) Int. Cl.
*G06Q 40/00* (2006.01)
(52) U.S. Cl. ............. 705/35; 705/30; 705/33; 705/34; 705/65; 455/405; 455/406
(58) Field of Classification Search .............. 455/406, 455/408, 411, 412.2, 405, 410, 413, 414.1; 705/65, 67, 68
See application file for complete search history.

(56) References Cited

U.S. PATENT DOCUMENTS

| | | | |
|---|---|---|---|
| 5,995,822 A | 11/1999 | Smith et al. | |
| 6,044,360 A * | 3/2000 | Picciallo | 705/21 |
| 6,157,648 A | 12/2000 | Voit et al. | |
| 7,162,220 B2 * | 1/2007 | Hanson | 455/405 |
| 7,366,495 B1 * | 4/2008 | Magnotta et al. | 455/406 |
| 2001/0023181 A1 | 9/2001 | Savolainen | |
| 2002/0116338 A1 * | 8/2002 | Gonthier et al. | 705/52 |
| 2002/0138557 A1 | 9/2002 | Mukaiyama et al. | |
| 2002/0161830 A1 | 10/2002 | Mukaiyama et al. | |
| 2002/0161831 A1 | 10/2002 | Nakaoka et al. | |
| 2002/0186408 A1 | 12/2002 | Nakaoka et al. | |
| 2003/0037176 A1 * | 2/2003 | Dannehr et al. | 709/313 |
| 2003/0078031 A1 * | 4/2003 | Masuda | 455/406 |
| 2003/0101135 A1 * | 5/2003 | Myatt et al. | 705/40 |
| 2003/0102235 A1 * | 6/2003 | Swaim et al. | 206/320 |
| 2004/0077332 A1 * | 4/2004 | Ephraim et al. | 455/405 |
| 2004/0148384 A1 * | 7/2004 | Ramakrishnan et al. | 709/224 |
| 2004/0203580 A1 * | 10/2004 | Engelhart | 455/406 |
| 2004/0203585 A1 * | 10/2004 | Wills et al. | 455/406 |
| 2005/0075957 A1 * | 4/2005 | Pincus et al. | 705/35 |

(Continued)

FOREIGN PATENT DOCUMENTS

JP 2002-55913 2/2002

(Continued)

OTHER PUBLICATIONS

Partial Translation of Japanese Office Action; dated Sep. 22, 2008.

(Continued)

*Primary Examiner* — Dai A Phuong
(74) *Attorney, Agent, or Firm* — Alston & Bird LLP (57) ABSTRACT

A communications system including at least one user device, configured to access a plurality of services in a session. An information store stores information defining an amount of money for the user device. A controller requests at least a portion of the amount of money to be reserved and controls the allocation of the reserved portion of money between the plurality of services.

43 Claims, 4 Drawing Sheets

U.S. PATENT DOCUMENTS

| | | | |
|---|---|---|---|
| 2005/0090249 A1* | 4/2005 | Straulino | 455/432.3 |
| 2005/0102230 A1* | 5/2005 | Haidar | 705/40 |
| 2007/0027990 A1 | 2/2007 | Nakaoka et al. | |

FOREIGN PATENT DOCUMENTS

| | | |
|---|---|---|
| JP | 2002-133336 | 5/2002 |
| JP | 2002-330239 | 11/2002 |
| JP | 2002-352148 | 12/2002 |
| WO | WO-0161460 A1 | 8/2001 |
| WO | WO-0161461 A1 | 8/2001 |
| WO | WO-0161462 A1 | 8/2001 |
| WO | WO-0161463 A1 | 8/2001 |
| WO | WO 01/86933 A2 | 11/2001 |
| WO | WO 02/51118 A1 | 6/2002 |
| WO | WO 03/058997 A1 | 7/2003 |

OTHER PUBLICATIONS

Partial Translation of Japanese Office Action; dated Apr. 27, 2009.
International Search Report for Application No. PCT/IB2004/000165 dated Oct. 28, 2004.
Written Opinion for Application No. PCT/IB2004/000165 dated Nov. 3, 2004.
International Preliminary Report on Patentability for Application No. PCT/IB2004/000165 dated Apr. 21, 2005.

* cited by examiner

COMMUNICATION SYSTEM

REFERENCE TO RELATED APPLICATIONS

This application claims priority of U.S. Provisional Patent Application Ser. No. 60/442,061, entitled "Communication System" filed on Jan. 24, 2003, the contents of which are hereby incorporated by reference.

BACKGROUND OF THE INVENTION

1. Field of the Invention

The present invention relates to a communication system.

2. Description of the Related Art

Telecommunications networks typically operate in accordance with a given standard or specification which sets out what the various elements of the network are permitted to do and how that should be achieved. For example, the standard or specification may define whether the user, or more precisely, user equipment or terminal is provided with circuit switched and/or packet switched service. The standard or specification may also define the communication protocols and/or parameters which shall be used for the connection. In other words, the standards and/or specifications define the "rules" on which the communication can be based. Examples of the different standards and/or specifications for wireless communication include, without limiting to these, specifications such as GSM (Global System for Mobile communications) or various GSM based systems (such as GPRS: General Packet Radio Service), AMPS (American Mobile Phone System), DAMPS (Digital AMPS), WCDMA (Wideband Code Division Multiple Access) or TD/CDMA in UMTS (Time Division/Code Division Multiple Access in Universal Mobile Telecommunications System), IMT 2000 and so on.

In known wireless telecommunications systems such as GSM, GPRS and the proposed third generation system UMTS, a user can pay for calls and services in one of two ways. Firstly, the user is billed for the calls and services that the user has used or made. This occurs after the user has made the call or used the service. Secondly, the user makes a payment in advance. As the user makes calls or uses service, the amount held on account is reduced. The user can top up or replenish the account in various different ways.

In the pay in advance environment (sometimes referred to as pay-as-you go or pre-payment), an entity is provided which stores the amount of money which the user currently has left. As the user makes calls or uses services, the stored amount is debited by the amount used. In some systems, when a user starts to make a call or use a service, a given amount of the stored amount is reserved for the service. If necessary, it is possible to reserve further amounts. When a call or service is completed, any unused portion of the reserved amount is returned to the stored amount. The stored amount is thus updated to reflect the amount of money used.

However, the issue of how to deal with access to a number of different services in a single session in the context of a prepaid environment has not been addressed.

Another problem is that the entity responsible for storing the amount used may in some UMTS systems use the CAMEL (Customized Applications for Mobile Network Enhanced Logic) protocol. However this protocol cannot handle monetary amounts.

A further problem is that the amount of communication with the entity responsible for charging should be kept to a minimum. If the signaling is not minimized the capacity of this entity would need to be increased. This would increase the cost of the entity, which is in any event costly. In any case minimizing signaling is always desirable.

A further problem relates to the reservation of an amount. If too small an amount is reserved, then the amount of signaling required is increased. If too large an amount is reserved, then the user may not have enough money for anything else or even enough money for the reservation.

SUMMARY OF THE INVENTION

It is an aim of embodiments of the present invention to address one or more of the problems described.

The invention is directed to a communications system including at least one user device. The at least one user device can be configured to access a plurality of services in a session. An information store stores information defining an amount of money for the at least one user device. A controller requests at least a portion of the amount of money to be reserved and controls the allocation of the reserved portion between the plurality of services.

The invention also includes a communications system including at least one user device. The user device can be configured to access a plurality of services at the same time. A first entity stores information defining an amount of money for the at least one user device. A controller requests a reservation of at least a portion of the amount of money. The first entity is configured to send information defining the amount of the reserved portion in a first form and the controller is configured to convert information relating to the reserved amount to a second form.

The invention also includes a communications method including the steps of accessing a plurality of services in a session. Information defining an amount of money for at least one user device is stored. At least a portion of the amount of money to be reserved is requested. An allocation of the reserved portion between the plurality of services is controlled.

The invention also includes controller for use in a communications system. The controller includes at least one user device. The user device can be configured to access a plurality of services in a session. An information store stores information defining an amount of money for the at least one user device. The controller can be configured to request at least a portion of the amount of money to be reserved and to control an allocation of the reserved portion between the plurality of services.

The invention also includes a communications method including the steps of accessing a plurality of services at the same time. Information defining the amount of money for the at least one user device is stored. A reservation of at least a portion of the amount of money is requested. Information defining an amount of the reserved portion in a first form is sent. Information relating to the amount of the reserved portion is converted to a second form.

The invention also includes a controller for use in a communications system. The controller includes at least one user device configured to access a plurality of services at the same time. A first entity stores information defining an amount of money for the at least one user device. The controller can be configured to request a reservation of at least a portion of the amount of money, and to convert information defining the amount of a reserved portion in a first form received from the first entity to a second form.

Embodiments of the present invention may allow credit control in a prepaid environment for services such as data access services with optimized communications towards network elements and the entity storing information on the amount of money the user has.

Embodiments of the present invention may allow the realization of real time credit control for data access services in more granular manner.

BRIEF DESCRIPTION OF DRAWINGS

For a better understanding of the present invention and as to how the same may be carried into effect, reference will now be made by way of example to the accompanying drawings in which.

DETAILED DESCRIPTION OF THE PREFERRED EMBODIMENTS

The present invention is described herein with reference to a particular illustrative embodiment. However, such embodiment is presented for the purposes of illustrating the present invention, and does not limit the scope thereof.

In particular, the present invention is described herein with reference to an example of a UMTS (Universal Mobile Telecommunications System) network supporting user equipment, such as a mobile station 2.

Figure 1:
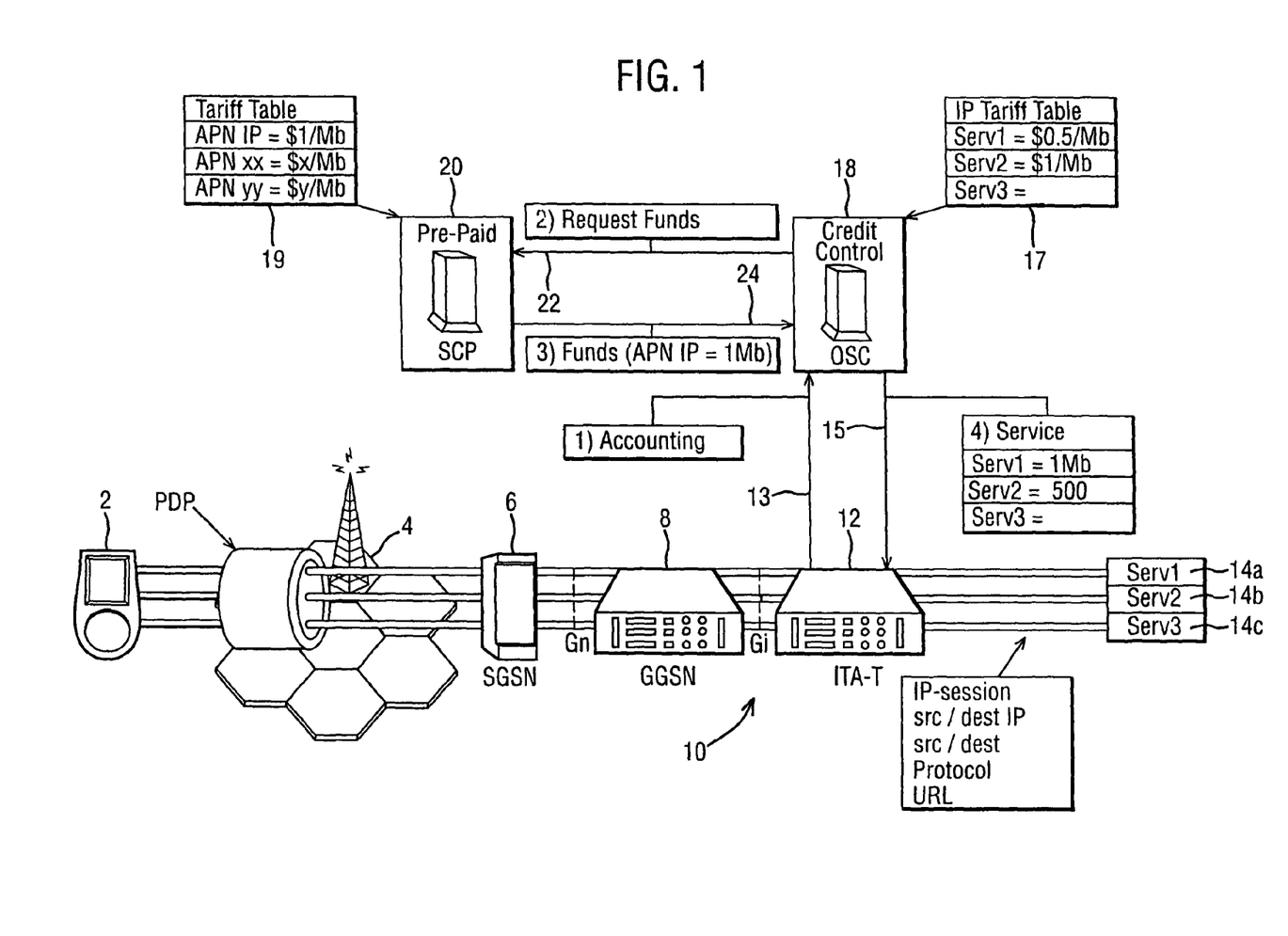
FIG. 1 shows a schematic view of a system embodying the present invention.

Referring to FIG. 1, there is illustrated the main elements of a UMTS network implementing an IP protocol system for the purposes of describing the present invention. In FIG. 1 the elements of a UMTS system relevant to the understanding of embodiments of the invention are illustrated. The full implementation of such a system will be apparent to one skilled in the art.

FIG. 1 illustrates generally a UMTS network infrastructure 10 including a radio access network 4, a serving GPRS support node (SGSN) 6, and a gateway GPRS support node (GGSN). The radio access network is typically made up of a plurality of base stations, which are controlled by radio network controllers.

The SGSN 6 provides access over the radio access network 4 for user equipment UE 2 to the network. The SGSN 6 is connected to the GGSN 8. The SGSN and the GGSN represent the packet switched domain of the network 10 of FIG. 1. They can provide control and transfer of packets between the UE 2 and applications provided in the same network 10 or in other external networks.

In embodiments of the invention, the user can be arranged to access services. Embodiments of the present invention can be particularly applicable to the provision of Internet services, that is http (Hyper Text Transfer Protocol) traffic. Embodiments of the invention can of course be used with any other services, particularly but not exclusively Internet related services. For the purpose of this document, the term "service" should be construed to include services provided to the user by, for example, a service provider, access services where a user accesses a network or the like, call services where a user makes or receives a call or anything with the user station is involved in which incurs a charge.

The GGSN 8 can be connected to an Internet traffic analyzer ITA 12. The ITA 12 can be arranged between the GGSN 8 and the Internet, represented in FIG. 1 by three Internet servers 14a, 14b and 14c. The ITA 12 does not usually interfere with the Internet traffic but merely observes it. However, in some embodiments, it can, for example, prevent the user from accessing certain sites which have been blocked for that user or the like. The function provided by the ITA 12 will be discussed in more detail later.

The ITA 12 can be connected to an OSC (online service controller) 18. The purpose of the OSC 18 is to perform online credit control for services delivered through the network i.e. data access network devices, application servers or the like. The OSC 18 handles end user prepaid account balance for services which are concurrently delivered through the network. Embodiments of the invention are applicable to situations where a plurality of services are accessed at the same time or in a single session. The OSC operates in a RADIUS protocol environment. Other protocols can of course be used in alternative embodiments of the invention such as DIAMETER or the like. The function of the OSC will be described in more detail later.

In embodiments of the present invention, the user equipment 2 is arranged to work at least partially on a pre-paid basis. This means that the user pays a sum in advance and as the user incurs charges, these are deducted from the pre-paid sum. Information about the current amount of money which a user has available is stored in a service control point SCP 20 which in this description will be referred to as an external balance handler EBH. Thus, when a user incurs charges the information stored in the EBH 20 will be updated. The EBH 20 can be provided by any suitable SCP such as an IN SCP (Intelligent Network SCP), a GSM SCF (service control facility) a suitable server such as for example a LDAP (Lightweight Directory Access Protocol) or by any other suitable entity. The EBH 20 is connected to the OSC 18.

In preferred embodiments of the present invention, the EBH stores the monetary amount which a user has in his prepaid balance account. The EBH then translates money into tokens for time or volume in response to a request. However, in alternative embodiments of the invention, the EBH can store instead of the actual monetary amount something which represents the actual monetary amount. For example, a number of tokens can be stored. Each token would represent a given monetary value. In alternative embodiments of the present invention, the EBH may store the amount of data represented by the monetary value, time or the like.

The EBH 20 in preferred embodiments of the present invention can be arranged to operate in accordance with the CAMEL protocol.

The EBH 20 can be arranged in embodiments of the present invention to have a tariff table 19. This stores the cost for a given volume of data. Each user will be associated with at least one value in the table. In a preferred embodiment of the invention the entry or entries are the same for all users, in other words there can be a single tariff table for all users.

In some embodiments, the user can be associated with only one value whilst in other embodiments of the invention, the user can be associated with more than one value. In some embodiments of the invention, each entry in the table is associated with a number of users. For example, there may be only a relatively small number of entries in the table for example between 1 and 10 and preferably between 1 and 5. In other embodiments of the present invention, there may be a separate entry for each user.

Any association between the user and the entry or entries in the table required is stored in preferred embodiments of the invention in the OSC 18. In alternative embodiments of the invention, the association may be provided in the EBH itself.

One example of a tariff table 19 is shown in FIG. 1. It shows an association between an APN (access point name) and the cost for a given quantity of data. In preferred embodiments of the invention, the APN is an example of a dummy name. The EBH 20 can access the required entry depending on the identity of the APN supplied by the OSC. The dummy name format means that embodiments of the invention are able to operate in a CAMEL environment and in particular in a CAMEL phase III environment.

In preferred embodiments, the notional cost for a given volume of data is stored in the tariff table. However, in alternative embodiments of the invention different information may be stored such as the cost for a given amount of time or a service access parameter such as a given number of computer "clicks" (that is the number of times a particular mouse or equivalent function is activated by the user), a given number of accesses or the like. It should be appreciated that in some embodiments where the EBH stores, for example, the amount of data representing the prepaid amount the tariff table may not be necessary.

The OSC 18 can perform reservation handling in order to achieve concurrent use of services charged through single prepaid account balance. In embodiments of the invention, the OSC 18 significantly optimizes the amount of communication realized towards EBH as well as the ITA by applying reservation logic and token (or monetary value) allocation logic, as explained in more detail hereinafter.

The OSC 18 can also contain a tariff table 17. This contains a table which lists for each of the servers which the user can access a tariff. For example the first entry represents the cost for the first server 14a and shows that the cost for 1 MB of data is for example, €0.5, the second entry represents the cost for the second server 14b which is for example, €1 for 1 MB of data whilst the cost for the third server 14c is nothing, that is it provides a free service. A tariff table may be provided for each user. A given table may be shared among a plurality of users.

The OSC 18, when no more money is available in the account balance for a given user, can initiate end user disconnection and after a predefined timeout initiate end user session disconnection. Alternatively or additionally, the OSC can initiate end user redirection to a top up page from which the user is able to replenish the prepaid account balance.

In summary, the OSC 18 can have one or more dialogues with the EBH 20. Through the dialogue with the EBH 20 money is reserved, money is deducted from/added to the prepaid account balance and notifications are received for the status of the prepaid account balance. The OSC 18 can maintain one or more accounting session dialogues towards the network elements for a single end user. When the OSC 18 receives a request 13 from a network element, it requests money from the EBH 20 via connection 22. The OSC 18 receives money from the EBH 20 via connection 24 and applies a reservation algorithm according to the current amount of reservations, amount of different network elements supported as well as the number of the different service classes supported. In case where the requesting network element is an access network device, the OSC 18 can calculate based on the money reserved for that particular accounting session the amount of service tokens expressed in volume, time or the like which should be delivered to the requesting network element.

Thus, the OSC 18 can calculate service tokens and delivers them to the ITA 12 via connection 15.

Figure 2:
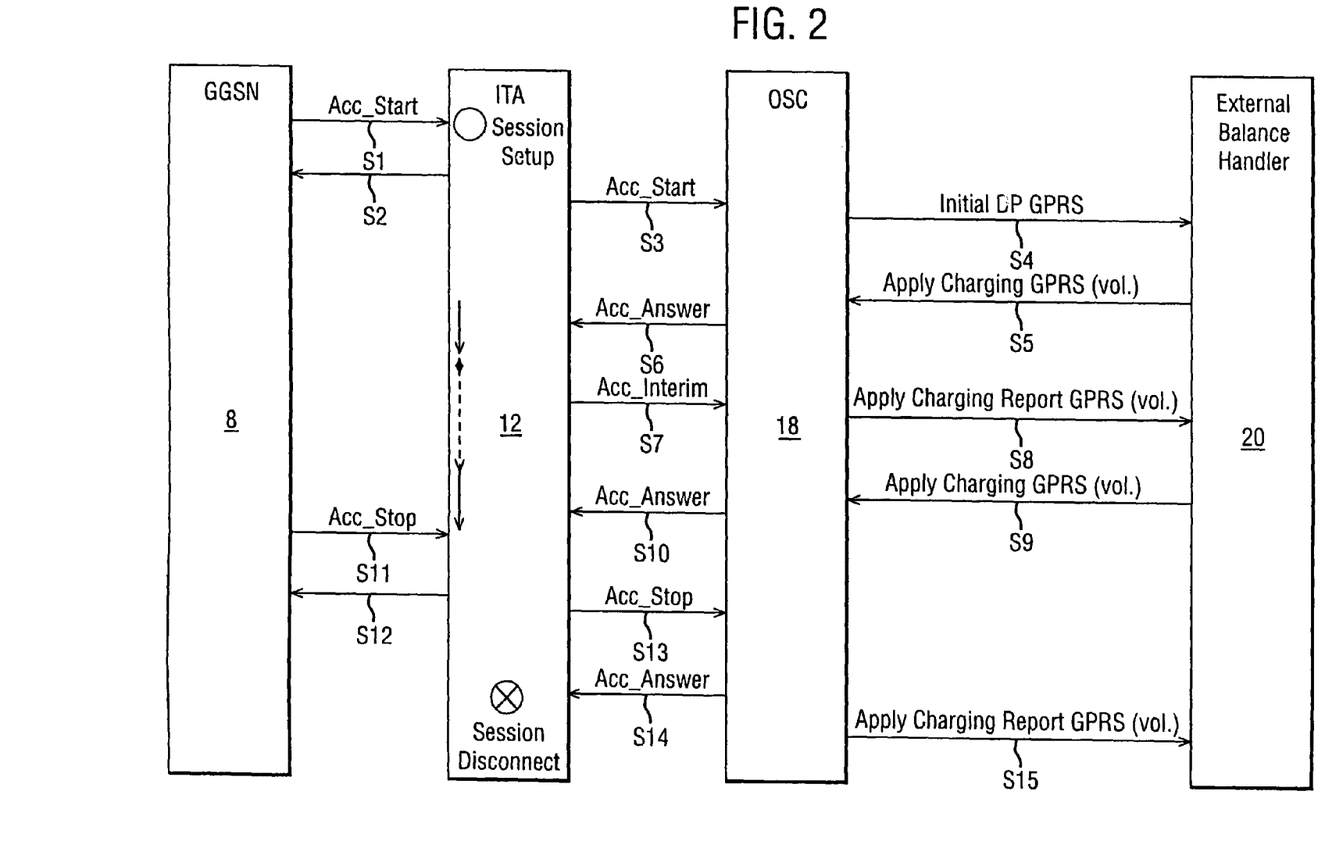
FIG. 2 shows a first signaling flow embodying the present invention.

One example will now be described with reference to FIGS. 1 and 2. In the example the ITA is arranged to count the number of bytes. However in alternative embodiments of the invention, other entities can be arranged to count the number of bytes. For example, the GGSN may count the bytes or any other suitable entity.

A user initiates a session and accesses three services provided by servers 14a to c in the same session, possibly at the same time. This is detected by the ITA 12 which in step S1 receives an accounting start request from the GGSN 8. The ITA 12 acknowledges the request to the GGSN 8 in step S2. In step S3, the ITA 12 sends an accounting request to the OSC 18, which includes the user's identity and the identity of the servers.

In step S4, the OSC 18 sends a request to the EBH 20 including the identity of the user and the dummy APN identity which is stored in the tariff table in the EBH 20. In step S5, the EBH looks up the tariff table using the dummy APN and returns information defining the data volume associated with an amount to be reserved. For example the dummy APN provided is that of the first entry. The EBH therefore reserves for example, €1 of the user's balance and returns the information that 1 MB has been reserved.

The OSC 18 then converts the data back to a monetary amount, that is back to for example, €1. This requires some knowledge of the tariff table of the EBH 20 at the OSC 18. The OSC carries out a money reservation algorithm based on the current amount of the reservation, the number of different network elements supported as well as the number of the different service classes supported. In a preferred embodiment of the invention, the money is not allocated to particular ones of the service but instead allows the money to be allocated as required.

In this embodiment, the OSC 18 sends the amount of tokens expressed in terms of volume, time, service parameters that can be used by the different service classes to the ITA 12 in step S6. The ITA 12 carries out the following calculation regularly:

$$x/A + y/B + Z/C = 1$$

where x, y and z are the counters the ITA has and A, B, and C are the amount of volume sent to the ITA. When the sum is equal to 1 all of the money has used. The amount of money reserved is used to calculate the number of tokens.

In an alternative embodiment, the OSC send the amount of monetary information to the ITA and if necessary the tariff information for the services currently used by the user. In this alternative embodiment, the ITA carries out the following calculation regularly.

$$(X \times A) + (Y \times B) + (Z \times C)$$

where X, Y and Z are the number of bytes provided by the respective servers 14a-c and A, B and C are the costs per data unit of those respective servers. Thus X×A represents the costs incurred by a server 14a and so on. When the total comes close to or equals for example, €1, which is the reserved amount, the ITA 12 sends a message to the OSC in step S7.

The process of reserving further money is then repeated by steps S8 to S10 which are the same or similar to steps S4 to S6. Again the ITA carries out the calculation. This reservation and using up of the reserved money can be carried out a number of times. In the example shown in FIG. 2, the user decides to end the session and the GGSN 8 sends an accounting stop message to the ITA 12 in step S11. In step S12, the message is acknowledged by the ITA 12 which sends an acknowledgement to the GGSN 8. The ITA 12 disconnects the session and sends an accounting stop message in step S13 to the OSC 18 which replies with an account answer message in step S14. This acknowledges the stop message. The account stop message S10 sent by the ITA 12 also includes information about how much of the currently reserved money was actually used up.

In step S15, the OSC 18 sends a charging report message to the EBH 20 indicating how much of the reserved money has been used. This report can indicate how much has been used in the entire session or more preferably will indicate how much of the currently reserved money has been used. The EBH will then update the amount of money associated with the user. The charging report sent to the EBH will indicate the amount used up or remaining in terms of the data unit. The required conversion between monetary value and data unit will be carried out in the OSC 18.

The embodiment described operates in an environment where user is concurrently using services provided by one or more servers. In addition, one or more of the services are data access services, which are charged under different rates.

Figure 3:
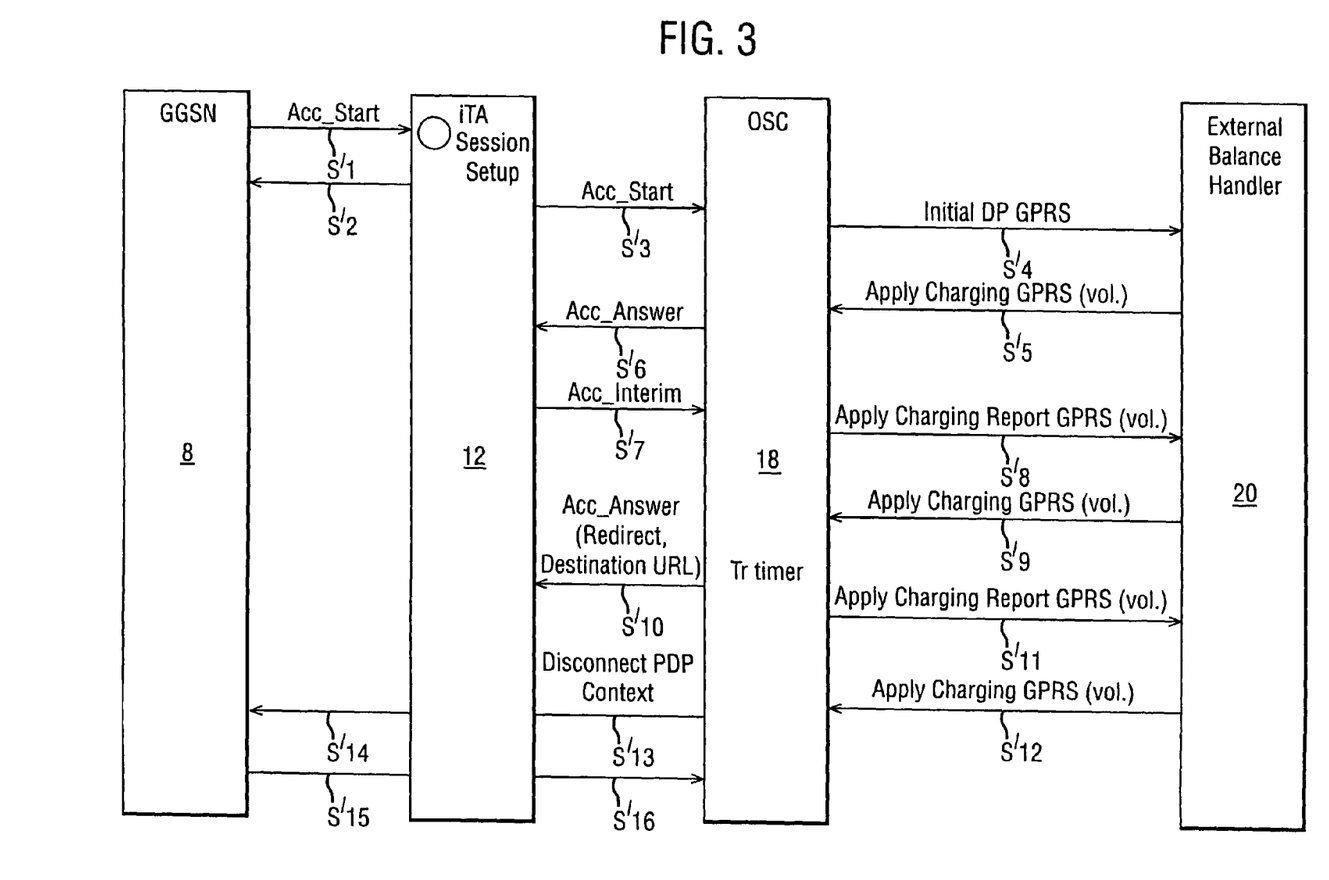
FIG. 3 shows a second signaling flow embodying the present invention.

Reference is made to FIG. 3 which shows the signaling which occurs when a user runs out of money. Steps S'1 to S'8 are the same as steps S1 to S8 shown in FIG. 2 and will not be described in detail. In step S'9, the EBH advises the OSC that the user has no more money in his account. In step 10' the OSC 18 then sends this information to the ITA 12 so that the user will be redirected to a top page or be provided with an appropriate message. A timer is started. At the end of the time period, the OSC 18 is arranged to check if the EBH has been topped up. This is done in steps S'11 and S'12 which are the same as steps S'8 and S'9. If there are still no funds, then the connection is disconnected The PDP context is then released in step S'13 to S'16. A message is sent to the GGSN 8 via the ITA 12 (steps S'13 and S'14). This is acknowledged in step S'15 and S'16 from the GGSN 8 to the OSC 18.

It should be appreciated that in practice, there may be other signaling between the entities but that this has been omitted for clarity.

In one alternative to the embodiment described, the ITA unit stores information defining which servers provide a free service. Accordingly, the request for funds can only be initiated if the user accesses a server which requires payment.

It should be appreciated that alternative methods can be used in embodiments of the invention. The preferred embodiment effectively dynamically allocates the reserved funds to the different services. In an alternative embodiment of the invention, the reserved funds can be allocated to the different servers. The ratio into which the reserved money is divided can be based on the cost of a data unit so that if the cost is higher the server gets a larger amount of the reserved funds. Alternatively the reserved money can be divided in equal parts based on the number of servers. When one of servers uses up their share of the reserved money, unused money allocated to other of the servers can be reallocated to that server One of these alternative embodiments will now be described in more detail with reference to the table below. In the example below, €2 is reserved and there are four services identified in column 1. The cost of the services is listed in the second column. In this example the reserved amount is divided into four, so that each service is allocated €0.5. This is converted into service tokens, that is the amount of data that can be obtained for €0.5 and this is listed in column 3. Column 4 could contain the number of service tokens used and column 5 provides access device counters which count the amount of data used.

| Service identifier | Service rate | Service tokens granted | Service tokens used | Access device counters |
|---|---|---|---|---|
| 1. default | €.5/MB | 1 MB | | X |
| 2. e-mail | €.1/MB | 5 MB | | Y |
| 3. FTP | €.9/MB | .56 MB | | Z |
| 4. URL 1 | €2/MB | .25 MB | | W |

In preferred embodiments of the invention, further funds can be reserved only when the currently reserved money have run out or when a certain percentage of the reserved money has been used up or when there is a certain monetary value which is left. In some embodiments, the point at which additional money is reserved can depend on at least one of the following:

The number of servers, the cost for a unit amount of data and the activity rate of the connection.

In one embodiment of the invention, the tariff stored at the EHB is such that for a given user, it is possible to reserve different amounts of money. This can take into account at least one of the following: the amount of money which the user has, the number of servers to which the user is connected, the cost for a unit amount of data and the activity of the connection.

In embodiments of the invention, the OSC can convert the monetary value into tokens.

Figure 4:
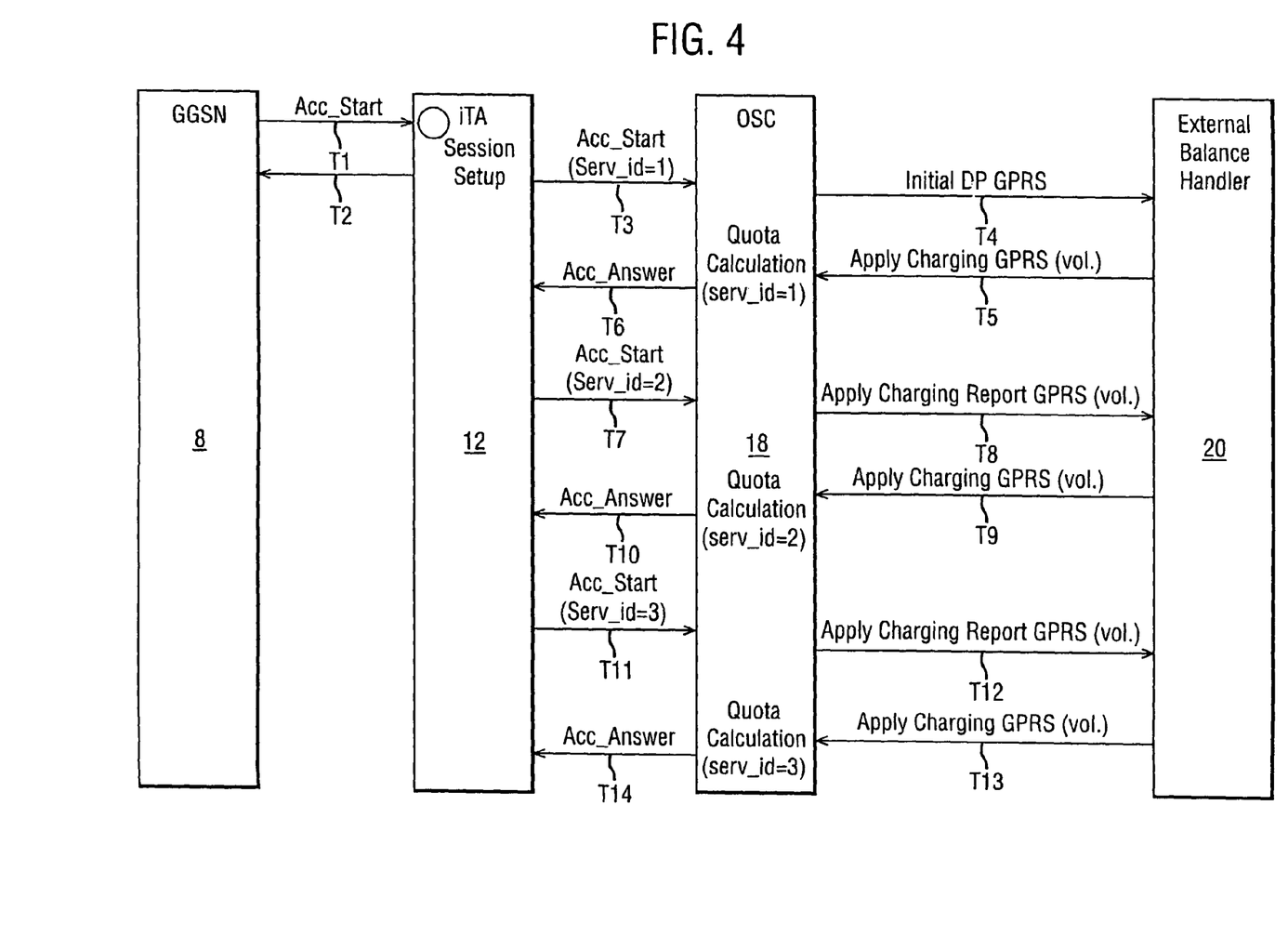
FIG. 4 shows a further signaling flow embodying the present invention.

FIG. 4 shows an arrangement which is in accordance with an embodiment of the invention. The arrangement of FIG. 4 shows that for each server, a request for a reservation of funds needs to be made. Steps T1 to T6 are the same as steps S1 to S6 of FIG. 2 with the exception that this can be done only for server 1. Steps T7 to T10 correspond to steps T3 to T6 but are for server 2. Likewise for server 3, steps T11 to T14 are performed which correspond to steps T3 to T6. As can be seen from FIG. 4 this unnecessarily increases the signaling as a reservation needs to be made for each server, regardless of whether or not the total usage by the servers is less than one reserved amount of money. However, this may be desirable in certain embodiments of the invention.

Advantages of embodiments of the present invention are that:

A minimum amount of signaling such as RADIUS messages are exchanged between the OSC 18 and network access devices. This means that the network and processing loads are minimized;

There is a single EBH 20 dialogue which minimizes SS7 links, and the CAMEL protocol transactions;

There may be a single service logic in the EBH 20 logic which minimizes the processing load in EBH 20; and There are single money reservations leading to a good utilization of an end user account balance.

Embodiments of the present invention allow credit control for concurrently used services, at least some being data access services.

Embodiments of the present invention optimize the number of protocol messages needed (e.g. traffic optimization) and allow for concurrent use of data access services. Since the data access services consumption model is unpredictable, embodiments of the invention allows an end user to consume any combination of data access services offered from one or multiple network servers while minimizing the amount of connections required with the EBH.

It should be noted that the elements and connections shown in FIG. 1 are for the purposes of illustrating an exemplary embodiment of the invention only, and one skilled in the art will fully understand the implementation of a UMTS network 10.

In the described embodiments are made to different charges being made for different services. In alternative embodiments of the invention, different charges may be made for different service classes.

Embodiments of the present invention are particularly applicable to communication systems which use IP protocols such as SIP (session initiated protocol), HTTP, RTCP/RTPm (Real-Time Control Protocol/Real time protocol), FTP (File Transfer Protocol) or the like. However, it should be appreciated that embodiments of the present invention can be used with any suitable network using any suitable protocol. Embodiments of the present invention are particularly applicable to embodiments where the user equipment is attached to the network via a wireless connection. However it should be appreciated that embodiments of the present invention are also applicable to systems where the user equipment is attached to the network via a wired connection.

The user equipment can take any suitable form and may for example be a mobile telephone, mobile station, personal digital assistant, laptop computer, portable computer, computer or any other suitable equipment.

In some embodiments of the invention, the GGSN and the ITA are provided by a single entity.

Embodiments of the present invention have been described in relation to a UMTS telecommunications network. It should be appreciated that embodiments of the present invention can be used with other networks using any other standard. Embodiments of the present invention have been described in relation to a wireless telecommunications network. It should be appreciated that embodiments of the present invention may also be used in relation to a wired communications network.

The present invention is described herein with reference to examples of preferred embodiments for the purpose of illustration, and is not limited to any such embodiments. The scope of the present invention is defined by the appended claims.

The invention claimed is:

1. An apparatus comprising a controller configured to:
   cause sending of a request that a first entity to reserve a portion of an amount of money as a reserved portion, the first entity including an information store configured to store information defining the amount of money for use by at least one user device, wherein the apparatus is separate from said first entity and said at least one user device; and
   control an allocation of said reserved portion between a plurality of services to be accessed by said at least one user device during a session,
   wherein the allocation is dynamically controlled after the request is made such that said reserved portion is allocated between said plurality of services as required by the services, without dividing said reserved portion into a plurality of parts between said plurality of services.

2. The apparatus as claimed in claim 1, wherein the controller is further configured to monitor how much of said reserved portion has been used.

3. The apparatus as claimed in claim 2, wherein the controller is further configured to monitor said reserved amount by periodically determining how much of said reserved portion each of said plurality of services have used to provide a plurality of values and summing the plurality of values.

4. The apparatus as claimed in claim 2, wherein the controller is further configured to monitor how much of said reserved portion has been used by using information defining a cost of said plurality of services.

5. The apparatus as claimed in claim 4, wherein said information comprises a cost for one of a data or time unit.

6. The apparatus as claimed in claim 1, wherein when said reserved portion is used up or has been at least partially used up a further portion of said amount of money is reservable.

7. The apparatus as claimed in claim 1, wherein said information store comprises one of, a monetary value, a data amount representative of said amount of money, a time representative of said amount of money, and an amount of a service access parameter.

8. The apparatus as claimed in claim 1, wherein at least one of said plurality of services comprises an interne service.

9. The apparatus as claimed in claim 1, further comprising a plurality of entities.

10. The apparatus as claimed in claim 9, wherein said plurality of entities comprises at least one of a traffic analyzer and a credit controller.

11. The apparatus as claimed in claim 1, further comprising a credit controller.

12. The apparatus as claimed in claim 1, further comprising a storage configured to store information relating to a cost of said plurality of services.

13. The apparatus of claim 1, wherein the controller configured to control the allocation of said reserved portion includes being configured to:
   calculate utilization components for each service of the plurality of services;
   combine the utilization components into an aggregate utilization; and
   compare the aggregate utilization to an aggregate threshold associated with the reserved amount.

14. The apparatus of claim 13, wherein the controller is further configured to request that the first entity reserve an additional portion of said amount of money based on the comparison between the aggregate utilization and the and the aggregate threshold.

15. An apparatus comprising a controller configured to:
   cause sending of a request for a reservation of a portion of an amount of money as a reserved portion, the amount of money being defined by information stored at a first entity;
   receive from said first entity information defining an amount of said reserved portion, said information defining said amount of said reserved portion in a first form other than a monetary amount;
   convert the information defining said amount of said reserved portion in the first form to a second form as a monetary amount of said reserved portion; and
   dynamically control an allocation of said monetary amount between a plurality of services to be accessed simultaneously by a user device such that said monetary amount is allocated between said plurality of services as required by the services, without dividing said monetary amount into a plurality of parts between said plurality of services.

16. The apparatus as claimed in claim 15, wherein the first form is one of a cost for a unit amount or a payment parameter of at least one service of said plurality of services.

17. The apparatus as claimed in claim 16, wherein said payment parameter is data volume, time, or service parameter of at least one service of said plurality of services.

18. The apparatus as claimed in claim 16, wherein said information in said first form comprises said unit amount.

19. The apparatus as claimed in claim 18, wherein said controller is further configured to convert said unit amount to a corresponding monetary amount to provide said second form.

20. The apparatus as claimed in claim 15, which is configured to operate in accordance with a remote authentication dial-in user service (RADIUS) protocol.

21. The apparatus as claimed in claim 15, wherein said first form comprises at least one of time, data volume, or service access parameter.

22. The apparatus as claimed in claim 21, wherein said service access parameter comprises at least one of number of clicks or number of accesses.

23. A method, comprising:
cause sending of a request for a portion of an amount of money to be reserved as a reserved portion to a first entity, the causing of the sending being performed by a controller that is separate from said first entity and at least one user device, the first entity storing information defining the amount of money for use by at least one user device; and
dynamically controlling, at said controller, an allocation of said reserved portion between a plurality of services to be accessed during a session after the requesting to the first entity, wherein the controlling comprises allocating said reserved portion between said plurality of services as required by the services, without dividing said reserved portion into a plurality of parts between said plurality of services.

24. The method as claimed in claim 23, comprising monitoring how much of said reserved portion has been used.

25. The method as claimed in claim 24, comprising monitoring said reserved amount by periodically determining how much of said reserved portion each of said plurality of services have used to provide a plurality of values and summing the plurality of values.

26. The method as claimed in claim 24, comprising monitoring how much of said reserved portion has been used by using information defining a cost of said plurality of services.

27. The method as claimed in claim 26, wherein said information comprises a cost for one of a data or time unit.

28. The method as claimed in claim 23, comprising reserving a further portion of said amount of money when said reserved portion is used up or has been at least partially used up.

29. The method as claimed in claim 23, wherein said information store comprises one of, a monetary value, a data amount representative of said amount of money, a time representative of said amount of money, and an amount of a service access parameter.

30. The method as claimed in claim 23, wherein at least one of said plurality of services comprises an internet service.

31. The method as claimed in claim 23, wherein said controller comprises a plurality of entities.

32. The method as claimed in claim 31, wherein said plurality of entities comprises at least one of a traffic analyzer and a credit controller.

33. The method as claimed in claim 23, wherein said controller comprises a credit controller.

34. A method, comprising:
cause sending of a request for a reservation of a portion of an amount of money as a reserved portion, the amount of money being defined for at least one user device by stored information;
receiving, at a controller configured to allocate the reserved portion between a plurality of services to be accessed simultaneously, information defining an amount of said reserved portion, said information defining said amount of said reserved portion in a first form other than a monetary amount;
converting the information defining said amount of said reserved portion in the first form to a second form as a monetary amount of said reserved portion; and
dynamically allocating said monetary amount between said plurality of services to be accessed simultaneously by the at least one user device such that said monetary amount is allocated between said plurality of services as required by the services, without dividing said monetary amount into a plurality of parts between said plurality of services.

35. The method as claimed in claim 34, wherein said first form is one of a cost for a unit amount or a payment parameter of at least one service of said plurality of services.

36. The method as claimed in claim 35, wherein said payment parameter is data volume, time, or service parameter of at least one service of said plurality of services.

37. The method as claimed in claim 35, wherein said information in said first form comprises said unit amount.

38. The method as claimed in claim 37, comprising converting said unit amount to a corresponding monetary amount to provide said second form.

39. The method as claimed in claim 34, comprising operating said controller in accordance with a remote authentication dial-in user service (RADIUS) protocol.

40. The method as claimed in claim 34, wherein said first form comprises at least one of time, data volume, or service access parameter.

41. The method as claimed in claim 40, wherein said service access parameter comprises at least one of number of clicks or number of accesses.

42. An apparatus, comprising:
means for causing sending of a request, at a controller, that a first entity reserve a portion of an amount of money as a reserved portion, the first entity including an information store configured to store information defining the amount of money for use by at least one user device, wherein the apparatus is separate from said first entity and said at least one user device; and
means for, after the request is made, dynamically allocating said reserved portion between a plurality of services as required by the services, without dividing said reserved portion into a plurality of parts between said plurality of services;
wherein said plurality of services is a plurality of services to be accessed by said at least one user device during a session,
and wherein the controller is separate from said first entity and said at least one user device.

43. An apparatus, comprising:
means for causing sending of a request for a reservation of a portion of an amount of money as a reserved portion, the amount of money being defined by information stored at a first entity;
means for receiving from said first entity information defining an amount of said reserved portion, said information defining said amount of said reserved portion in a first form other than a monetary amount;
means for converting the information defining said amount of said reserved portion in the first form to a second form as a monetary amount of said reserved portion; and
means for dynamically controlling an allocation of said monetary amount between a plurality of services to be accessed simultaneously by a user device such that said monetary amount is allocated between said plurality of services as required by the services, without dividing said monetary amount into a plurality of parts between said plurality of services.

* * * * *

UNITED STATES PATENT AND TRADEMARK OFFICE
CERTIFICATE OF CORRECTION

| | |
|---|---|
| PATENT NO. | : 8,082,197 B2 |
| APPLICATION NO. | : 10/612343 |
| DATED | : December 20, 2011 |
| INVENTOR(S) | : Lialiamou et al. |

It is certified that error appears in the above-identified patent and that said Letters Patent is hereby corrected as shown below:

Column 10,

Line 14, "interne service" should read --internet service--.

Signed and Sealed this

Thirteenth Day of November, 2012

David J. Kappos
*Director of the United States Patent and Trademark Office*